United States Patent
Hanke et al.

(10) Patent No.: US 6,193,611 B1
(45) Date of Patent: Feb. 27, 2001

(54) FLEXIBLE COUPLING

(75) Inventors: Wolfgang Hanke, Heidenheim; Armin Hartleitner, Ziertheim, both of (DE)

(73) Assignee: Voith Turbo GmbH & Co. KG, Heidenheim (DE)

( * ) Notice: Subject to any disclaimer, the term of this patent is extended or adjusted under 35 U.S.C. 154(b) by 0 days.

(21) Appl. No.: 09/190,655

(22) Filed: Nov. 12, 1998

(30) Foreign Application Priority Data

Nov. 14, 1997 (DE) .............................................. 197 50 408

(51) Int. Cl.[7] ....................................................... F16D 3/12
(52) U.S. Cl. ................................. 464/68; 464/24; 192/208
(58) Field of Search ................................... 192/208, 55.4; 464/24, 66, 68

(56) References Cited

U.S. PATENT DOCUMENTS

| | | | |
|---|---|---|---|
| 5,088,964 | * | 2/1992 | Kuhne ..................................... 464/24 |
| 5,194,045 | * | 3/1993 | Hanke ..................................... 464/24 |
| 5,573,460 | | 11/1996 | Toji . |
| 5,590,752 | * | 1/1997 | Takehira et al. ...................... 192/208 |
| 5,730,656 | * | 3/1998 | Yamamoto ............................. 464/24 |

FOREIGN PATENT DOCUMENTS

| | | | |
|---|---|---|---|
| 3901467 | * | 6/1990 | (DE) ....................................... 464/24 |
| 39 23 749 C1 | | 2/1991 | (DE) . |

* cited by examiner

Primary Examiner—Lynne H. Browne
Assistant Examiner—Aaron M Dunwoody
(74) Attorney, Agent, or Firm—Taylor & Aust, P.C.

(57) ABSTRACT

A disk-type flexible coupling, specifically for installation into the drive train of a motor vehicle between a combustion engine and a transmission, has a first coupling half. The first coupling half, by use of two side disks which are connected for torsional strength on the outer circumference, encloses a second clutch half which is formed by at least one center disk which is assigned to one hub. The coupling halves are interconnected through flexible coupling elements and have limited torsion relative to each other. The side disks border a liquid-tight inside chamber which is filled with a damping medium and which receives the center disk. In the inside chamber, a floating damping ring is provided which has limited torsion relative to the two coupling halves. The damping ring, together with the first coupling half, forms a first displacement chamber. The damping ring, together with the second coupling half, forms at least one second displacement chamber. The volume of both displacement chambers is variable. The first and second displacement chambers are connected conductively.

6 Claims, 3 Drawing Sheets

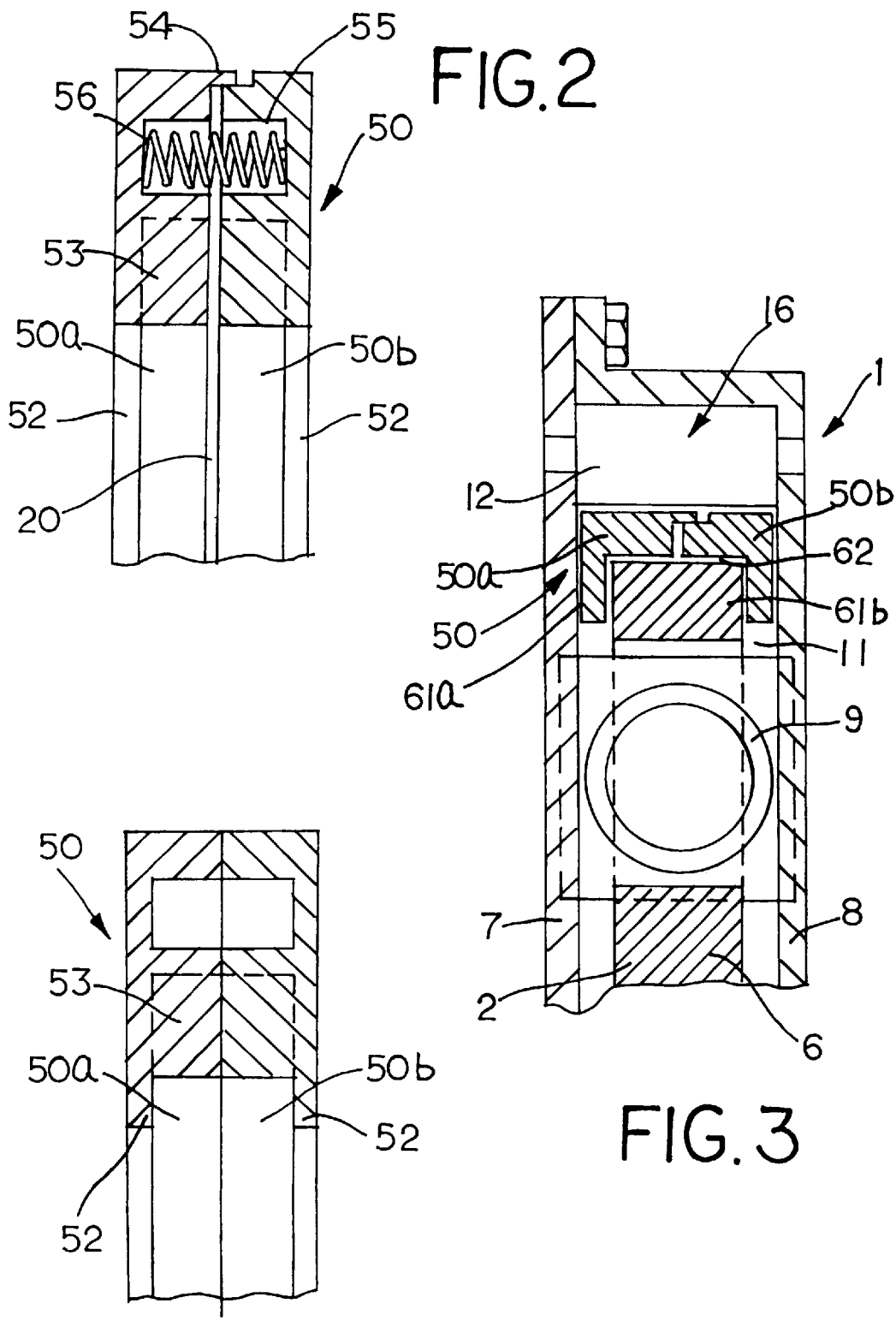

FLEXIBLE COUPLING

BACKGROUND OF THE INVENTION

1. Field of the Invention

The present invention relates to a flexible coupling, equipped with a damping device, specifically for a motor vehicle drive.

2. Description of the Related Art

In internal combustion engine drives, flexible couplings equipped with damping devices are utilized to keep torsional vibrations away from the following drive train. The damping capabilities of the flexible coupling, which is normally mounted on the motor flywheel, plays a special role in critical operational conditions.

In a coupling which is described in German patent document no. DE 3 923 749 (U.S. Pat. No. 5,194,045), a so-called floating damping ring, which is not connected positively with either coupling half, is provided in the interior space of the coupling that is filled with the damping medium. The floating damping ring forms at least a first displacement chamber, together with the first coupling half, and at least a second displacement chamber, together with the second coupling half. In this method, the floating damping ring is subjected to the free force-cycle during the relative movement of the two coupling halves, whereby it is twistable to a limited extent relative to each of the two coupling halves. In considering the dead weight of the floating damping ring, as well as the available gap cross sections, it is possible that, with small oscillation amplitudes, only one displacement chamber becomes effective for damping.

On larger oscillation amplitudes, especially at lower oscillation frequency, the second displacement chamber also becomes effective when the limited twisting of the floating damping ring relative to the one coupling half is being utilized and the twisting relative to the other coupling half is still available. The choice of two separate displacement chambers at the location of one floating damping ring offers the advantage that the coupling can react automatically with a damping of the torsional vibration, which is dependent on the energizing oscillation amplitudes. The coupling can also improve quiet running, even during load change processes.

This arrangement has proven itself in practical applications. However, at lower speeds an operational condition may occur in which the floating damping ring does not fulfil the function demanded of it to the required extent. U.S. Pat. No. 5,573,460 describes displacement chambers that are conductively connected. The damping ring is connected rigidly with one of the two coupling halves. It forms several displacement chambers with the other coupling half.

SUMMARY OF THE INVENTION

The present invention provides a coupling such that the floating damping ring develops optimum damping during all operational conditions. Specifically, the following is achieved: During one operational phase, damping medium is supplied to a first damping chamber from a second damping chamber via the aforementioned conducting connection. This ensures that the damping chamber achieves an optimum fill level during all operational conditions. This increases the efficiency of the damping ring, as specified.

The following is important: As soon as the floating damping ring stops against the cam of the center disk, the conductive connection is closed, resulting in a butterfly valve effect. Therefore, it is advisable to design the involved areas of the damping ring and cams of the center disk accordingly.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 2 is a partial, longitudinal section of the floating damping ring along the intersection line II—II in FIG. 1;

FIG. 3 is a partial, longitudinal section through the coupling along the line III—III in FIG. 1;

FIG. 4 is a partial, longitudinal section of another embodiment of the floating damping ring, similar to FIG. 2;

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
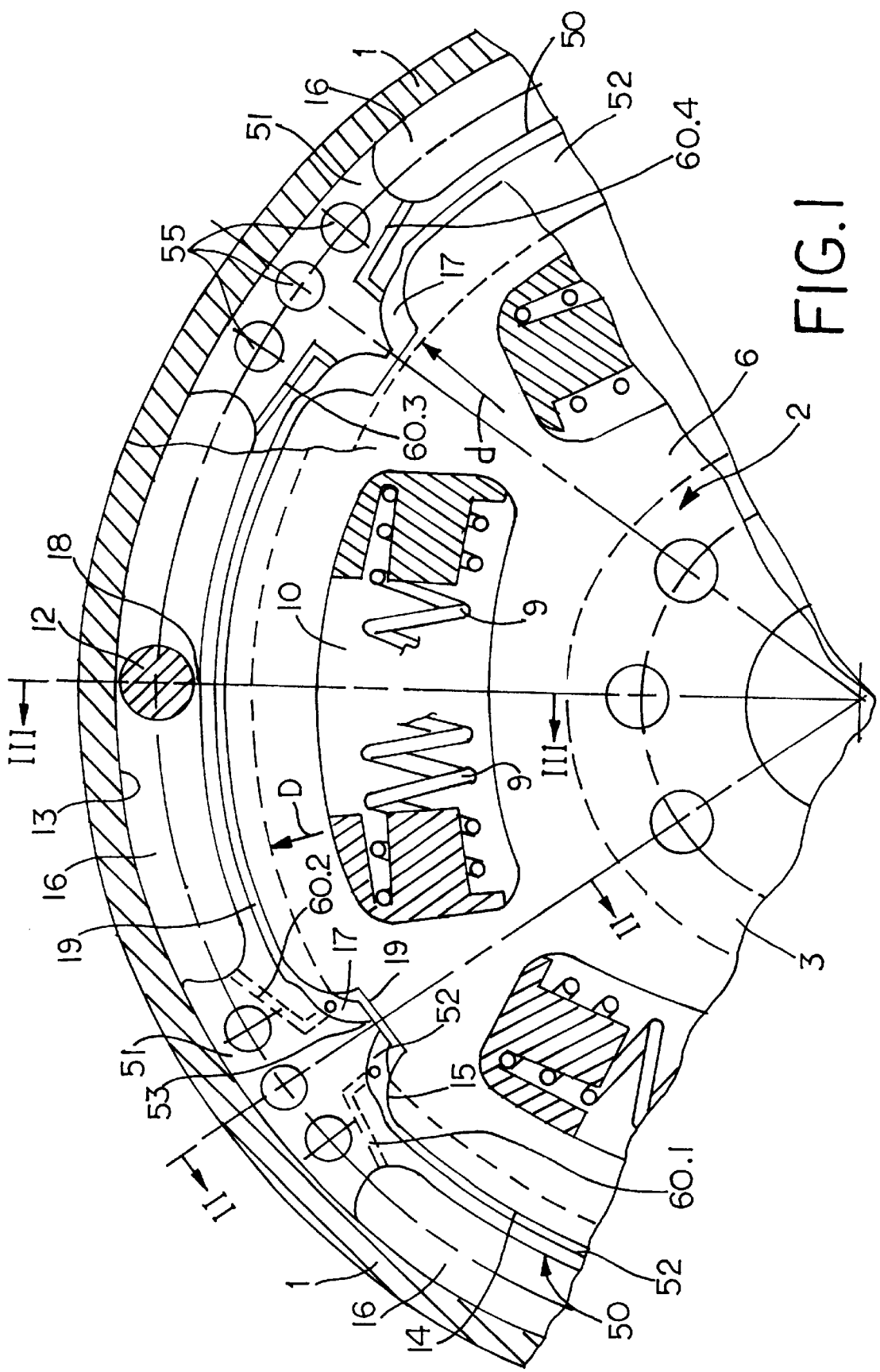
FIG. 1 is a schematic, partial cross section of one embodiment of the coupling according to the invention.

Referring now to the drawings and particularly to FIGS. 1 and 3, there are shown schematic sections through the coupling according to the invention. A first coupling half 1 is connected with a drive motor which is not illustrated here. A second coupling half 2 is connected with a transmission of a motor vehicle drive that is also not illustrated here. The first coupling half 1 includes two side disks 7, 8 which are connected at the outer circumference and form a liquid-tight interior space 11. Side disks 7, 8 surround second coupling half 2 which includes a center disk 6 and a hub 3. The transfer of torque between the two coupling halves 1, 2 occurs through tangentially arranged springs 9, which are located in corresponding cutouts 10 in the center disk 6, or in the side disks 7 and 8.

A floating damping ring 50 is located between the outer circumference 14 of the center disk 6 and the radial outer circumference of the interior space 11. Damping ring 50 is swivel mounted so that it can be turned inside the first coupling half 1. Damping ring 50 is guided to have limited rotation ability relative to the first coupling half 1 as well as to the second coupling half 2, or, more particularly, to the center disk 6. However, damping ring 50 is not positively connected with either of the two coupling halves 1 or 2. The floating damping ring 50 forms a first displacement chamber 16 with the first coupling half 1, and a second displacement chamber 17 with the second coupling half 2, or, more particularly, the center disk 6. The floating damping ring 50 is equipped with several cams 51 on the outer circumference which, with axially arranged bolts 12 between the two side disks 7, 8, limit the first displacement chambers 16. In order to form the second displacement chamber 17, the floating damping ring 50 is equipped with protrusions 53 facing to the inside, and which submerse into corresponding recesses 15 on the center disk 6. The two displacement chambers 16 and 17 are of a different size. The first displacement chamber 16 extends over a large twisting angle between cam 51 and bolt 12. To surmount this, the floating damping ring 50 must displace the damping medium that is present in the interior space 11 through a gap 18 between bolt 12 and the floating damping ring 50. The displacement of damping medium in the second displacement chamber 17 occurs through gaps 61*a*, 61*b* and 62 between the floating damping ring 50 and the center disk 6.

As visible in FIG. 1, there are connecting channels between displacement chambers 16 and 17—see channels 60.1, 60.2 in the left-hand section of FIG. 1 and channels 60.3, 60.4 in the right-hand section of FIG. 1. These channels 60.1, 60.2, 60.3 and 60.4 ensure that sufficient damping medium is immediately available in each damping chamber 16, 17 that is being utilized at any given time.

As can be seen from FIG. 3, the floating damping ring 50 encloses the center disk 6 between itself, whereby the side parts 52, which point radially to the inside, form a partial side end for the second displacement chamber 17. The relative twistability of the floating damping ring 50 relative to the center disk 6 is limited by the protrusions 53 and by the sides of the recesses 15.

The described example provides for the twisting angle of the floating damping ring 50 inside the first displacement chambers 16 to be much larger than in the second displacement chambers 17. At the same time, the gaps 18 inside the first displacement chambers 16 are clearly much narrower than the gaps 19 in the second displacement chambers 17. In this way, different damping characteristics can be assigned to the two displacement chambers 16 and 17. In the present example, the selection has been made such that the second displacement chambers 17 are responsible for low damping oscillation amplitudes and, based on the large radial and axial gaps 19, develop only weak dampening. However, because of its narrow gap 18 inside the first displacement chambers 16, the floating damping ring 50 is assigned to the first coupling half 1 as far as vibrations are concerned, since the first displacement chambers 16 relative to the floating damping ring 50 counter with a comparatively high torsional resistance. At low oscillation amplitudes and particularly at higher frequency, the second displacement chambers 17 are predominantly effective. At higher oscillation amplitudes, particularly when running through critical speeds, the twisting angle inside the second displacement chamber 17 is immediately overcome so that the protrusions 53 rest in the recesses 15 and a positive slaving of the floating damping ring 50 with the center disk 6 occurs. This results in displacement of damping medium through gap 18 in the first displacement chambers 16 and strong damping of large amplitude oscillations. Tailor-made damping for any given oscillation variation is achievable through alternate assignment of the floating damping ring 50 to one of the two coupling halves 1, 2, governed by whether high or low amplitudes are present. Adaptation to different operational conditions, particularly to the typical oscillation behavior of a specific motor, is possible by a suitable selection of the twisting angles inside the two displacement chambers 16, 17, as well as through a suitable choice of gaps 18 and 19.

An alternative arrangement of the second displacement chamber 17 is illustrated in the right-hand section of FIG. 1. The side section 52 of the floating damping ring 50 extends considerably further, radially to the inside, than the recesses 15 of the center disk 6. The result is, above all, that the protrusions 53 on the floating damping ring 50 position themselves to be better dampened onto the sides of the recesses 15 after overcoming the twisting angle in the second displacement chamber 17. The side sections 52 show a smallest diameter d while the side sections 52 on the left-hand side of FIG. 1 display the largest diameter D.

From FIGS. 2 and 4 it is visible that the floating damping ring 50 is divided axially into two halves 50*a* and 50*b*. The two halves 50*a* and 50*b* are equipped with axial bores 55 in which spring elements 56 are inserted. These springs 56 expand the two halves 50*a* and 50*b* in axial direction against the insides of the side disks 7, 8. This causes a permissible friction damping between the floating damping ring 50 and the first coupling half 1. In addition, an internal pressure due to centrifugal force is caused between the two halves 50*a* and 50*b*, further supporting the effect of springs 56. A labyrinth-type centering may be provided, according to FIG. 2, whereby the outer ring 54 may be flexible on the one half 50*a*, particularly if the floating damping ring 50 is of synthetic material. There is a gap 20 between the two halves 50*a* and 50*b* through which damping medium may transfer from one displacement chamber into the other. Dimensioning of this gap may also contribute to optimization of the damping capabilities of the coupling.

The radial outer gap between cam 51 and the inside surface 13 of inside chamber 11 can be selected so that a sealing contact occurs just when the coupling's operating temperature has been reached. This results in the damping with cooler damping medium and a still large gap being of approximately the same magnitude as with a smaller gap and thinner operating medium. Temperature influences are thereby compensated. The same applies to dimensioning of gap 18. The same temperature compensation occurs at the second displacement chamber 17, where gap 19 increases with increasing temperature.

Figure 5:
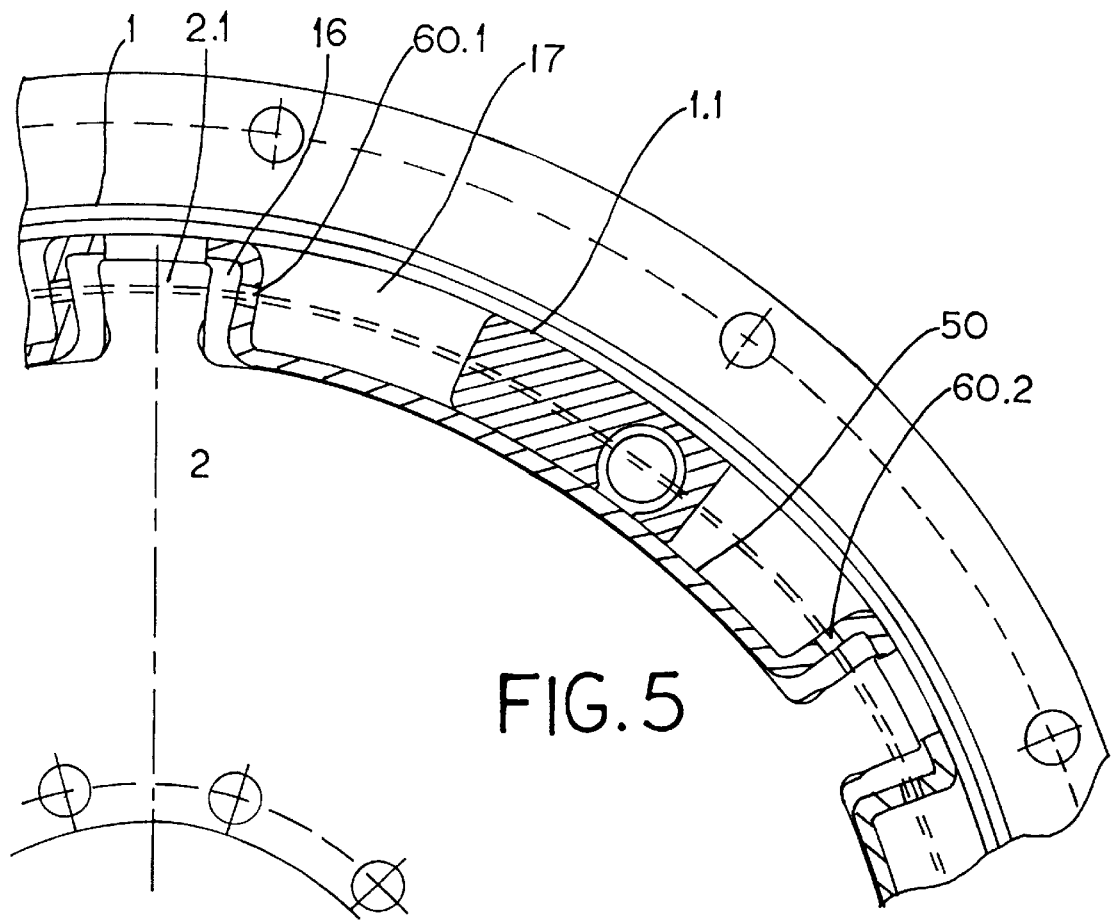
FIG. 5 is a schematic, partial cross section of yet another embodiment of the floating damping ring.

In the embodiment illustrated in FIG. 5, a first coupling half 1 and a second coupling half 2 are shown as decisive components. The floating damping ring 50 is here of relatively simple design, being shaped as ring of uniform thickness. At both its ends, ring 50 is bent at right angles.

A first damping chamber 16 is visible between one end of the floating damping ring 50 and a cam 2.1 of the second coupling half 2. Also, a damping chamber 17 is formed between the aforementioned end of the damping ring 50 and a cam 1.1. Cam 1.1 is a component of the first coupling half 1.

The bores in the ends of the floating damping ring 50 that are bent at right angles are critical. See bores 60.1 and 60.2.

Figure 6:
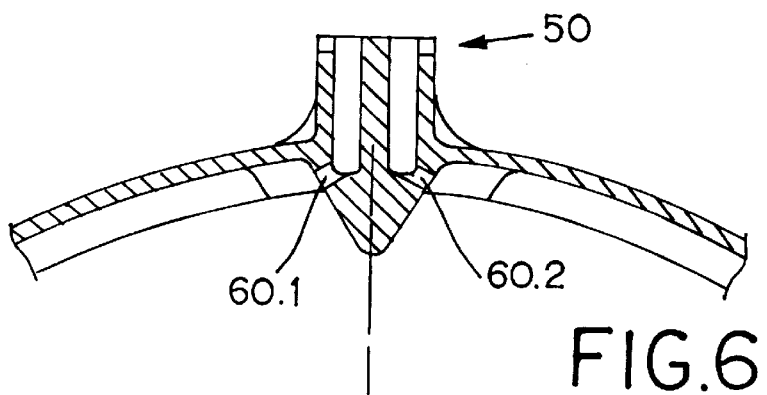
FIG. 6 is a schematic, partial cross section of still another embodiment of a floating damping ring.

The floating damping ring 50 according to FIG. 6 is essentially in the shape of a coathanger. Bores 60.1 and 60.2 are again visible. Each of these bores presents a conducting connection between two displacement chambers, that is, the one displacement chamber that is formed between the first coupling half (not illustrated here) and the floating damping ring 50, and a second damping chamber that is formed between the second displacement chamber (not illustrated) and the floating damping ring 50.

While this invention h as been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A flexible disk coupling for a drive train between a combustion engine and a transmission of a motor vehicle, said flexible disk coupling comprising:

a first coupling half including two side disks and an outer circumference interconnecting said two side disks;

a second coupling half surrounded by said two side disks of said first coupling half, said second coupling half including a hub and at least one disk associated with said hub;

a plurality of flexible coupling elements interconnecting said first coupling half and said second coupling half such that said first coupling half and said second coupling half have limited torsion relative to each other;

a substantially liquid-tight inside chamber defined by said two side disks of said first coupling half, said inside chamber receiving said at least one disk of said second coupling half, said inside chamber being configured for being filled with a damping medium;

a floating damping ring disposed within said inside chamber, said floating damping ring having limited torsion relative to said first coupling half and said second coupling half;

a first displacement chamber defined by said first coupling half and said floating damping ring, said first displacement chamber having a variable volume; and at least one second displacement chamber defined by said second coupling half and said floating damping ring, said at least one second displacement chamber being in fluid communication with said first displacement chamber, said at least one second displacement chamber having a variable volume.

2. The flexible disk coupling of claim 1, wherein said at least one disk of said second coupling half comprises a center disk.

3. The flexible disk coupling of claim 1, wherein said outer circumference of said first coupling half interconnects said two side disks for torsional strength.

4. The flexible disk coupling of claim 1, wherein said floating damping ring includes at least one channel, said first displacement chamber and said at least one second displacement chamber being in fluid communication via said at least one channel.

5. The flexible disk coupling of claim 1, wherein said floating damping ring includes one of at least one channel and at least one bore extending between said first displacement chamber and said at least one second displacement chamber.

6. The flexible disk coupling of claim 5, wherein said first displacement chamber and said at least one second displacement chamber are in fluid communication via said one of at least one channel and at least one bore.

\* \* \* \* \*